United States Patent [19]
Davidsz

[11] Patent Number: 5,907,476
[45] Date of Patent: May 25, 1999

[54] SELF-LOCKING RAIL SECUREMENT DEVICE

[75] Inventor: Mark E. Davidsz, Milwaukee, Wis.

[73] Assignee: Allen-Bradley Company, LLC, Milwaukee, Wis.

[21] Appl. No.: 08/920,917

[22] Filed: Aug. 29, 1997

[51] Int. Cl.[6] .............................. H05K 7/10; H05K 7/12; H05K 7/14

[52] U.S. Cl. .......................... 361/732; 361/729; 361/730; 439/716

[58] Field of Search ..................................... 200/293, 307; 211/41.01; 248/27.1, 27.3; 312/215, 216, 222; 361/600, 627, 629, 634, 636, 640, 644, 649, 652, 673, 729, 730, 731, 732, 747, 755, 801, 807, 809, 825, 828, 829, 832; 439/94, 341, 532, 716, 928; 403/16, 325, 321

[56] References Cited

U.S. PATENT DOCUMENTS

| | | | |
|---|---|---|---|
| 4,454,382 | 6/1984 | Borne et al. | 439/716 |
| 4,719,542 | 1/1988 | Lemmer | 361/809 |
| 4,947,290 | 8/1990 | Ootsuka | 361/809 |
| 5,392,196 | 2/1995 | Kinner | 361/809 |
| 5,480,310 | 1/1996 | Baum | 439/94 |

FOREIGN PATENT DOCUMENTS

| | | | |
|---|---|---|---|
| 0326624 | 8/1989 | European Pat. Off. | 439/716 |
| 90 03 885 | 3/1990 | Germany . | |

OTHER PUBLICATIONS

Siemens "Montagefreundliche AnschluBhelfer—die schraubenlosen Reihenklemmen 8WA2", Germany, Apr. 1997.

Weidmuller, "Innovations" Germany, Apr. 1997.

*Primary Examiner*—Donald Sparks
*Attorney, Agent, or Firm*—Patrick S. Yoder; John M. Miller; John J. Horn

[57] ABSTRACT

A modular structure for attachment to a rail includes securement members received and supported on either side of the rail. The rail includes a support web and parallel side flanges. The structure is constructed from a molded plastic base unit to which metallic securement members are assembled. The base unit preferably includes a rigid side and a flexible side. The securement members are substantially identical to one another, facilitating manufacturing and assembly, and reducing the number of different parts in the final module. The securement members each include v-shaped slots for engaging the side flanges of the rail. The base unit may be configured as a blank end unit, or may include features for creating terminal blocks, I/O blocks, switches, circuit board supports and the like.

19 Claims, 4 Drawing Sheets

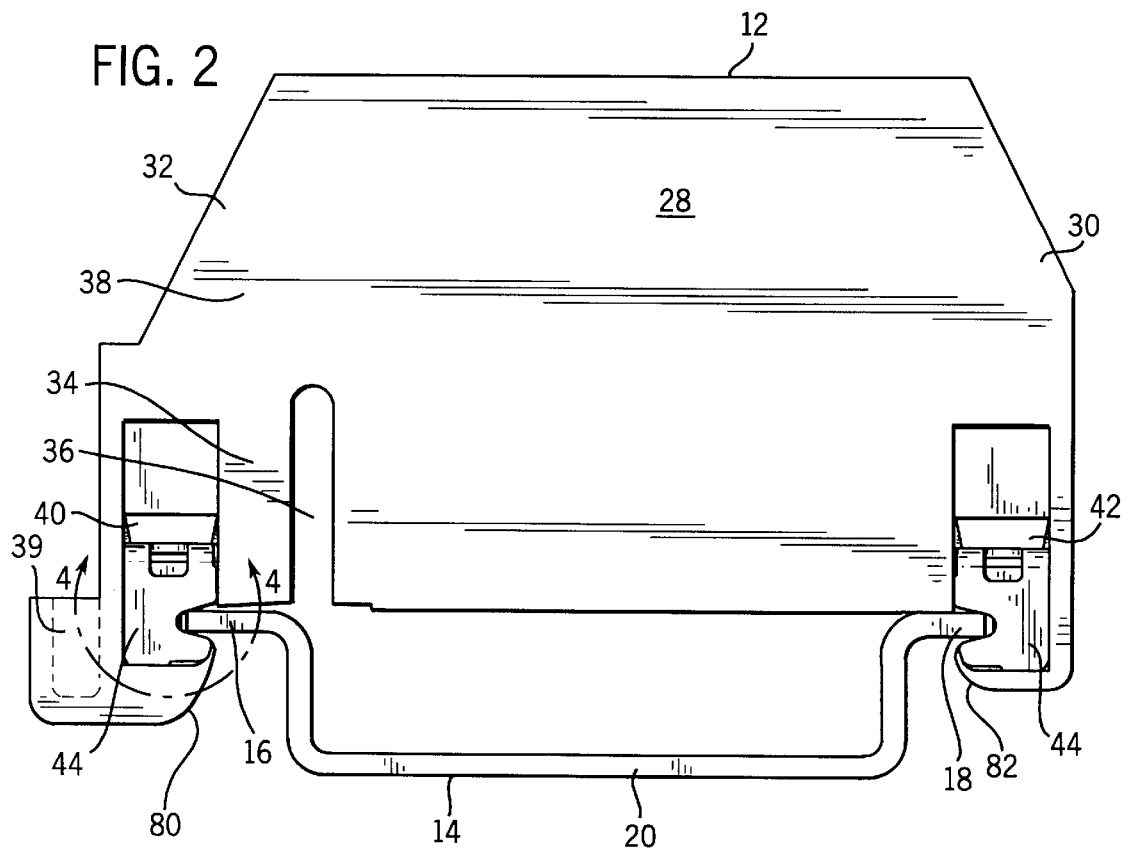
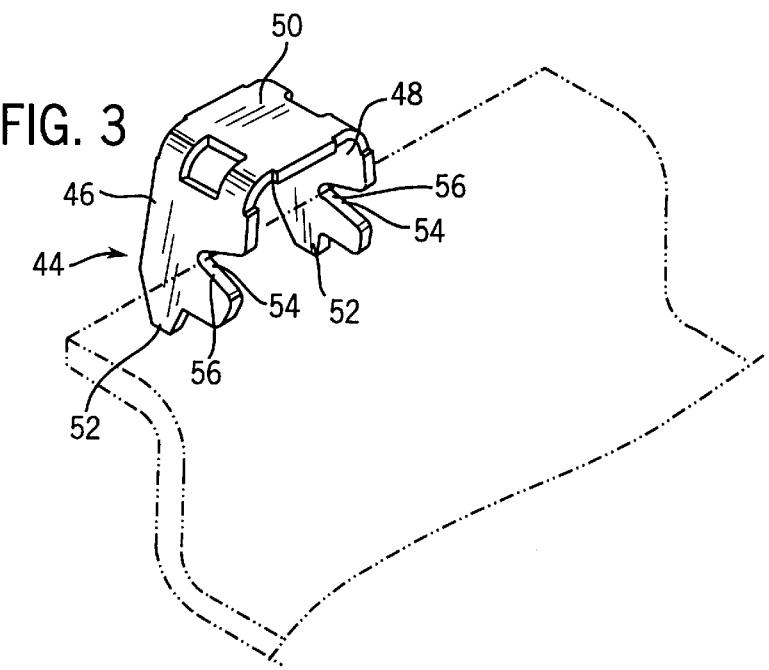

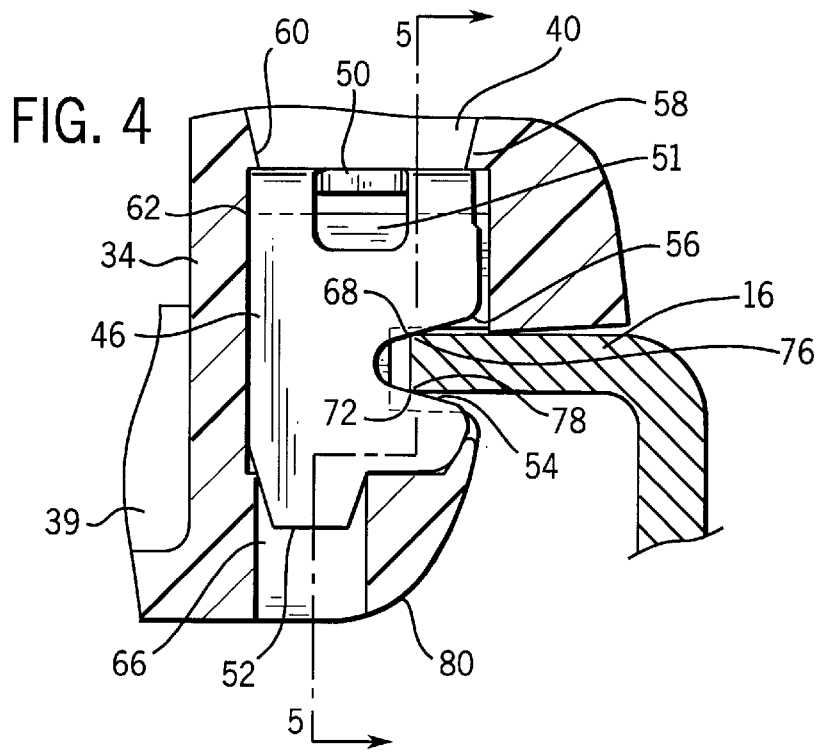
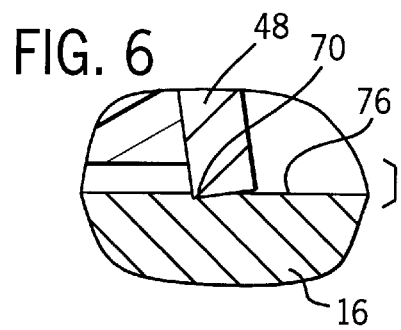
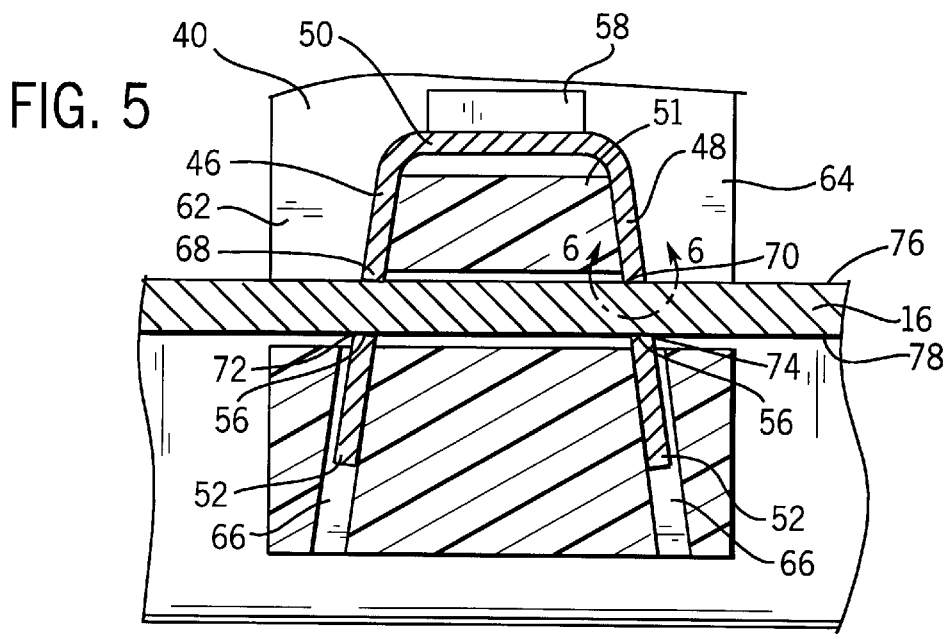

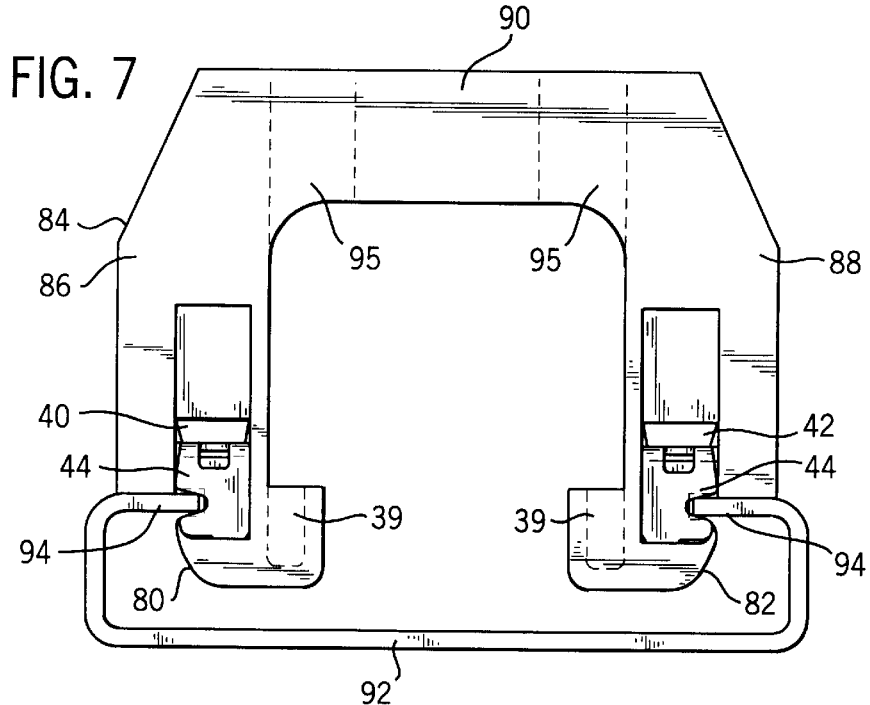
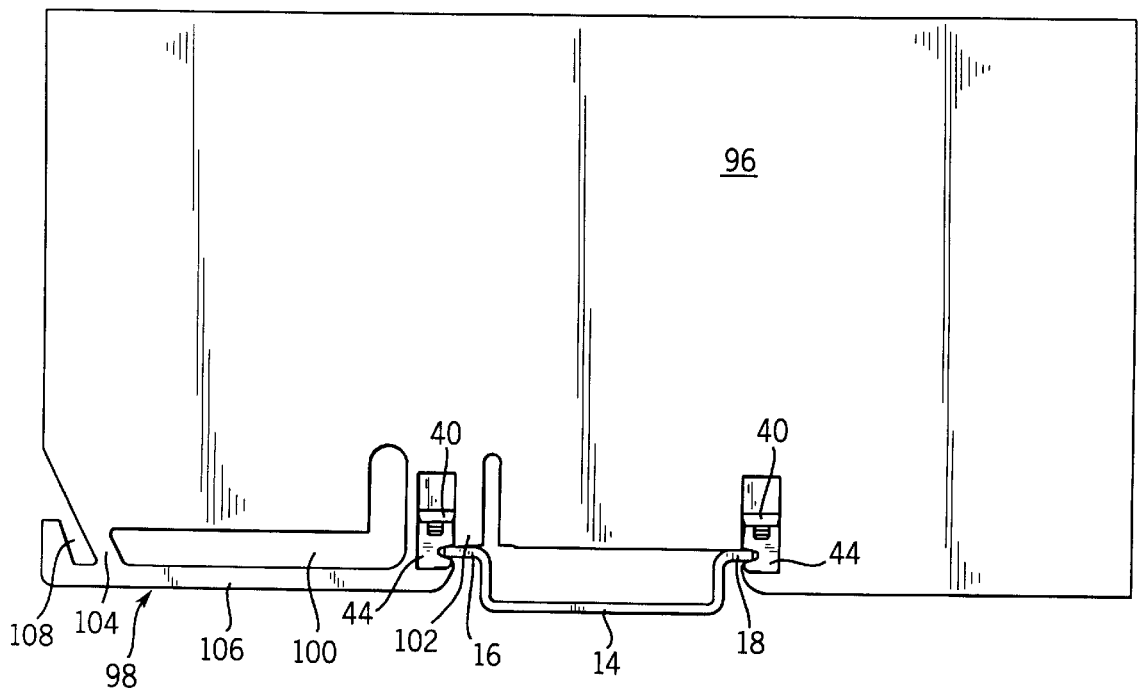

SELF-LOCKING RAIL SECUREMENT DEVICE

BACKGROUND OF THE INVENTION

1. Field Of The Invention

The present invention relates generally to the field of securement structures for aligning terminal blocks, input/output devices and other electrical components within enclosures and the like. More particularly, the invention relates to a self-locking, clip-in structure that can easily and quickly be mounted on a standard support rail, and that can be adapted for use as a terminal block or other device support.

2. Description Of The Related Art

A number of systems have been developed and are currently in use for mounting small components, particularly electrical components, in enclosures. Such systems include various conduit and rail structures useful for channeling wires to and from the components in a neat and orderly manner, facilitating installation and servicing. One popular system of this type is based upon a standard set of flanged rails that can be cut to a desired length and attached via screws to the interior of an enclosure. The rails, commonly referred to as "DIN" rails, have either inwardly or outwardly projecting raised flanges along their length for receiving the components. The components, including a wide array of modular elements such as terminal blocks, input/output modules, dip switches, and so forth, feature corresponding structures designed to interface with the rail flanges to hold the components securely in place during installation and use.

Known component mounting structures include screw-down and screwless styles. Screw-down structures generally clip into place along the DIN rail and may be slid along the rail for positioning. A screw held over one of the rail flanges is then driven into the flange to anchor the component in place. In addition to the cost of the screw and associated holding elements, a disadvantage of these structures is the need to independently secure each component via the screw. This process is not only time consuming, but may result in misalignment on the rail due to twisting of the component under the influence of the screw-down torque. In many applications, therefore, the screwless mounting arrangements are often preferable. These arrangements typically include a component module having a hook-shaped rigid foot that is slipped over a first of the rail flanges, and a deformable leg that is then snapped over the opposite flange to secure the component to the rail. Because the modules are typically made of a moldable plastic material due to its good electrical insulation capabilities, metallic clips and the like are often provided in the rail interface features to bind the component more securely in place on the rail. For removal, the deformable leg may be bent free of the rail flange and the component may be removed by unhooking the rigid foot from the opposite flange.

While such known screwless DIN rail mounting structures provide an attractive solution to the problem of quickly and easily attaching components in desired rail locations, they are not without drawbacks. For example, known arrangements of this type employ differently configured metallic securing elements on either side of the module. These elements must be added to the molded module during an assembly process, such as by heat staking. A first obvious drawback, then, results from the number of separate, different parts in the resulting assembly and the number of operations required to produce the final product. In addition, the metallic features typically include only three to five separate points of contact with the rail flanges. Because the force resisting movement of the component along the rail is generally a function of the number of contact point and the holding force exerted at each point, substantial spring force is often required in the deformable leg to attain the desired holding force, making the structure more difficult to snap into place and to remove from the rail. Moreover, due both to the different interface features and to the substantial spring force in conventional devices, the user must generally attach the module in a prescribed order (i.e., rigid foot first, then the deformable leg).

There is a need, therefore, for an improved arrangement for mounting components along DIN rails. The arrangement should be of a straightforward design that can be easily manufactured and assembled on the rail. In particular, there is a need for a DIN rail mounting structure that provides superior holding force while minimizing the number of different parts in the overall product.

SUMMARY OF THE INVENTION

The invention features a novel rail mounting module designed to respond to these needs. The module may be adapted to a number of different uses, such as for terminal blocks, end stops, input/output modules, device and switch supports, printed circuit board card supports and the like. In accordance with a preferred arrangement, the module features identical metallic securement elements on protruding feet, reducing the number of different parts in the structure. The module may be adapted for use on either inwardly or outwardly projecting rail flanges. The securement elements are preferably formed with at least four contact regions each, providing a total of eight separate regions at which holding forces are exerted. The spring force exerted by the deformable portion of the module may therefore be reduced as compared to existing devices without sacrificing holding force. Moreover, the securing feet of the module may be easily snapped to the support rail in any order.

Thus, in accordance with a first aspect of the invention, a module is provided which is configured to be secured to a mounting rail. The rail is of the type having first and second parallel raised mounting flanges extending along its length and a support web extending between the mounting flanges. The module includes a body, first and second securement feet, and first and second interface members. The body is configured to overlie the rail web when the module is installed on the rail. The first securement foot projects from the body and is configured at least partially to overlie the first flange when the module is installed on the rail. The second securement foot also projects from the body and is configured to at least partially overlie the second flange when the module is installed on the rail. The first interface member is coupled to the first securement foot and includes a plurality of contact regions configured to exert holding force on the first flange. The second interface member is coupled to the second securement foot and is substantially identical to the first interface member, including a plurality of contact regions configured to exert holding force on the second flange. In a particularly preferred configuration, the first and second interface members are generally U-shaped elements and include V-shaped recesses for contacting and securing the module to the rail flanges.

In accordance with another aspect of the invention, a module is configured to be secured to a mounting rail having first and second parallel raised mounting flanges extending along its length. A body of the module is configured to overlie a rail web when the module is installed on the rail. First and second securement feet project from the body and are configured at least partially to overlie the first and second rail flanges, respectively, when the module is installed on the rail. A first interface member is coupled to the first securement foot and includes at least three contact regions configured to bear against the first flange and thereby to exert a holding force on the first flange. A second interface member is coupled to the second securement foot and also includes at least three contact regions configured to bear against the second flange and thereby to exert a holding force thereon.

In accordance with another aspect of the invention, a modular component is provided which is configured for mounting on a rail of the type described above. The component includes a body configured to overlie the rail web when the module is installed thereon. A first securement foot projects from the body and is movable with respect to the body. The first securement foot is biased toward an operating position wherein the first securement foot at least partially overlies the first flange when the component is installed on the rail. The first securement foot has a first lower edge forming a first entry surface. The first entry surface is configured to contact the first flange and the urge the first securement foot away from the operating position during installation of the component on the rail. A second securement foot is rigidly secured to the body and is configured at least partially to overlie the second flange when the component is installed on the rail. The second securement foot has a second lower edge forming a second entry surface. The second entry surface is configured to contact second flange and to urge the body away from the first securement foot during installation of the component on the rail. First and second interface members are provided on the first and second securement feet, respectively. The interface members are configured to bear against the flanges and thereby to exert holding forces on the flanges.

BRIEF DESCRIPTION OF THE DRAWINGS

The foregoing and other features and advantages of the invention will become apparent upon reading the following detailed description and upon reference to the drawings in which:

FIG. 2 is an elevational view of a module of the type illustrated in FIG. 1 illustrating the components of the module permitting it to be secured to the rail;

FIG. 3 is a perspective view of a metallic insert or interface member which serves to contact the rail to maintain the module in place thereon;

FIG. 4 is a partial sectional view of a portion of the module of FIGS. 1 and 2, illustrating a preferred manner in which the member shown in FIG. 3 is held in place at selected locations on the module;

FIG. 5 is a detail view illustrating contact points between the interface member shown in FIG. 3 and a side flange of the mounting rail;

FIG. 6 is a detail view illustrating a preferred manner in which the interface member illustrated in FIG. 3 contacts side edges of the rail flange to maintain the module in place;

FIG. 7 is a side elevation of an alternative embodiment of the module, particularly well suited for use on mounting rails with in-turned flanges; and FIG. 8 is a side elevation of a large module, such as a circuit board or the like, mounted on a support rail of the type illustrated in FIG. 1.

DETAILED DESCRIPTION OF SPECIFIC EMBODIMENTS

Figure 1:
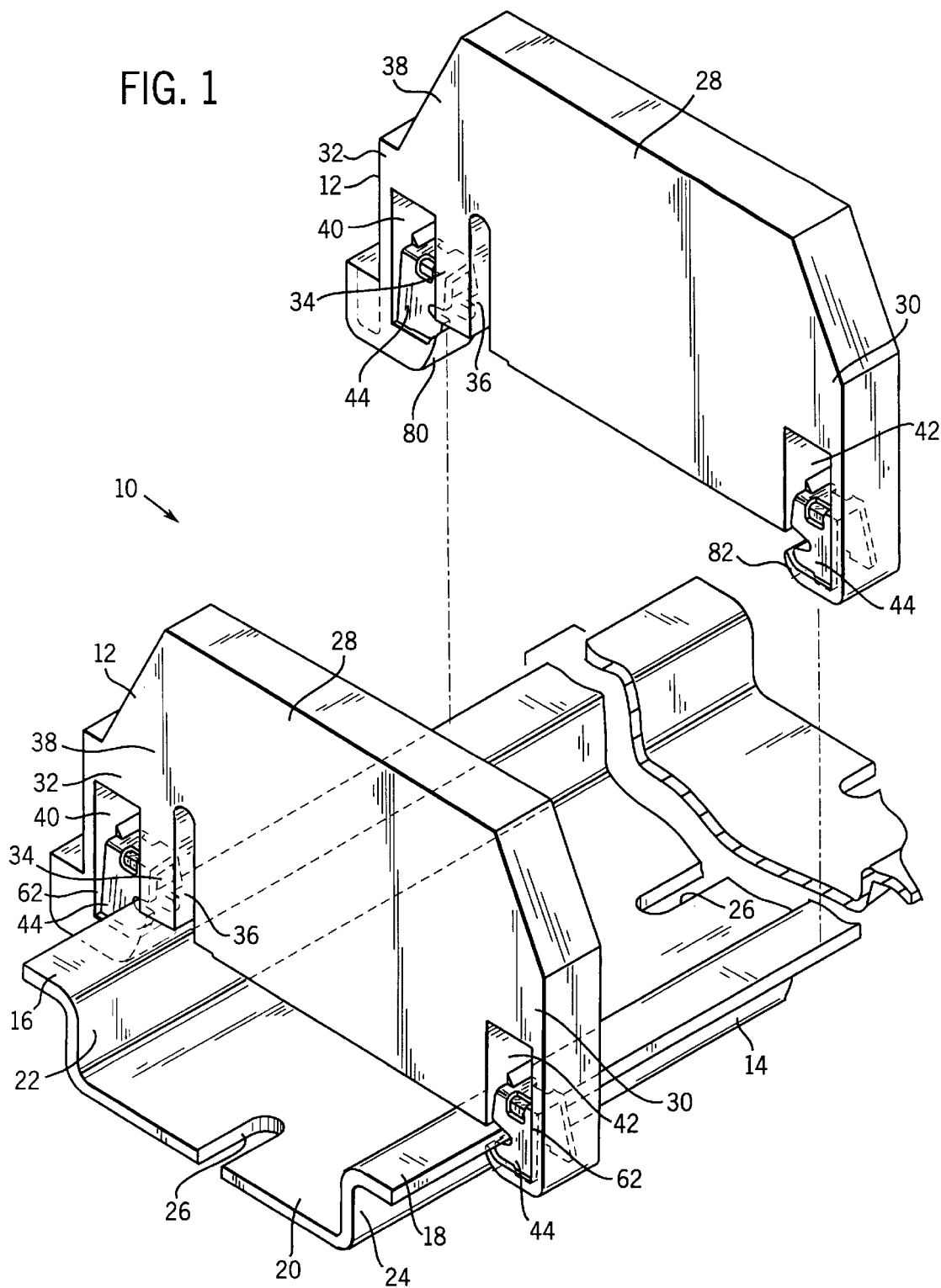
FIG. 1 is a perspective view of a modular element in accordance with the invention secured to a flanged mounting rail.

Turning now to the drawings and referring first to FIG. 1, a rail mounted support system, designated generally by the reference numeral 10, is illustrated as including a pair of modules 12 configured for mounting on a rail 14. Rail 14 is preferably an industry standard DIN-type, including a pair of laterally extending flanges 16 and 18 between which a lower securement web 20 extends. A pair of upright portions 22 and 24 support flanges 16 and 18 on web 20, respectively. A series of apertures or slots 26 are formed through web 20 to permit rail 14 to be easily secured to a support panel (not represented), such as in an electrical enclosure, control room, wiring cabinet, or the like, via suitable screws or bolts.

Modules 12 may include various features, depending upon their intended purpose in system 10. In the embodiment illustrated in FIGS. 1 and 2, modules 12 are end units such as would be placed at the terminal sides of a series of different modules mounted parallel to one another along rail 14. In general, modules 12 have a central portion 28 bounded by a substantially rigid side 30 and a flexible side 32. Rigid side 30 and flexible side 32 cooperate to solidly fix modules 12 to rail 14 as described more fully below. As will be readily appreciated by those skilled in the art, additional features such as screw terminals, clip terminals, input/output blocks, switches and the like may be readily incorporated into modules 12, while nevertheless preserving the essential securement features described herein.

Flexible side 32 of each module 12 includes an integral leg 34 formed generally in the plane of central portion 28. Leg 34 is separated from central portion 28 by a recess 36 extending from the base of module 12 to an upper bridge portion 38. A side recess 39 (see FIG. 4) is formed in leg 34 to accommodate a screw driver or similar tool for prying leg 34 from its normal position to release module 12 from rail 14 as described below.

Bridge portion 38 is preferably formed integrally with central portion 28 and leg 34. In a presently preferred embodiment, central portion 28, leg 34 and bridge portion 38 are formed as a single piece of moldable plastic material by a conventional injection molding process. Alternatively, additional elements may be formed separately and assembled together to define module 12, particularly where module 12 is configured to support circuit boards, switches or other electrical or mechanical devices. Bridge portion 38 and leg 34 are inherently elastically deformable to allow leg 34 to be bent slightly from its relaxed position illustrated, thereby permitting module 12 to be easily mounted onto and removed from rail 14.

Rigid side 30 and flexible side 32 of module 12 form cavities 40 and 42, respectively, in which securement members 44 are fixed. Each securement member 44 is preferably formed of a single piece of metal, such as stainless steel, by stamping and bending. Moreover, identical securement members 44 are provided on both rigid and flexible sides 30 and 32. As will be appreciated by those skilled in the art, this preferred feature of module 12 reduces the overall number of different parts comprising module 12, and simplifies material handling and assembly steps in the manufacture of the module.

The presently preferred form of securement members 44 is best illustrated in FIG. 3. Each securement member 44 has a generally inverted U-shape, comprising a pair of side panels 46 and 48 joined to one another by an upper plate 50. At the lower end of each side panel 46, 48, a centering extension 52 is formed to facilitate locating and holding the member in cavities 40 and 42 as described below. Along one edge of each side panel generally V-shaped notches or recesses are formed, bounded by engagement surfaces 56 for contacting flanges 16 and 18 of rail 14.

Rigid and flexible sides 30 and 32 include integrally formed features designed to cooperate with securement members 44 to locate and retain the latter in place once assembled within cavities 40 and 42. Thus, as best shown in FIG. 4, a central support 51 spans each cavity 40, 42 to center securement members 44 within the cavity. Wedge-shaped retaining darts or panels 58 and 60 extend into cavities 40 and 42 to contact upper plate 50 of securement member 44 and thereby to hold member 44 securely over central support 51. Lateral recesses 62 and 64 are formed on either side of central portion 51 to receive side panels 46 and 48 of member 44. Below each of these recesses, a centering recess 66 is formed on either side of central portion 51 to receive centering extensions 52 of side panels 46 and 48.

Securement members 44 are positioned within and assembled with rigid and flexible sides 30 and 32 as follows. Each member 44 is first positioned within a cavity 40, 42 with side panels 46, 48 straddling central portion 51. The member is then pressed down over central portion 51 until each centering extension 52 enters into a centering recess 66 beside central portion 51. Retaining darts 58 and 60 are elastically deformed as upper plate 50 is pressed downwardly, and once member 44 is pressed fully into the installed position illustrated, darts 58 and 60 clear plate 50 to return to their normal position, to bear against plate 50 as illustrated in FIG. 4. As mentioned above, where two identical securement members 44 are employed, assembly of both sides of module 12 follows the identical steps, facilitating the manufacturing operation.

In the preferred embodiment illustrated in the Figures, each securement member 44 defines a number of contact points at which the securement member binds against flanges of rail 14 to hold module 12 firmly in place. As best shown in FIGS. 5 and 6, engagement surfaces 56 surrounding V-shaped recess 54 form four such contact points on each securement member, resulting in eight separate contact points for each module. Thus, each member 44 forms a pair of upper contact points 68, 70, and a pair of lower contact points 72, 74, in mutually opposing relation to the upper contact points. Moreover, in addition to having the general shape of an inverted U, member 44 is open slightly such that side panels 46 meet upper plate 50 an angle of just over 90 degrees, effectively forming contact points 68, 70, 72 and 74 along corners of engagement surfaces 56 (see, e.g., contact point 70 in FIG. 6).

Each contact point is configured to engage a corresponding edge corner of a flange 16 or 18 of rail 14 as shown in FIGS. 4 and 5. Thus, upper contact points 68 and 70 contact an upper corner 76 of a corresponding flange (see, e.g., corner 76 of flange 16 shown in FIG. 5), while lower contact points 72 and 74 contact a lower corner 78 of the flange (see, e.g., corner 78 of flange 16 in FIG. 5). It has been found that the foregoing structure, including multiple contact points, mutually opposing positions of the contact points and corner engagement of the rail flanges, provides excellent resistance to sliding of module 12 along rail 14, with a reduced holding or spring force from flexible side 32 as compared with conventional rail mounting structures.

To facilitate mounting module 12 on rail 14, rigid and flexible sides 30 and 32 include lower entry surfaces 80 and 82, respectively, as best illustrated in FIGS. 1 and 2. Entry surfaces 80 and 82 are curved inwardly and located along module 12 so as to overlie flanges 16 and 18 slightly when module 12 is positioned above rail 14. Alternatively, entry surfaces 80 and 82 may be angled toward one another to form wedge-type inner surfaces on either side of module 12. This structure permits module 12 to be easily secured to rail 14 in several ways. For example, securement member 44 of rigid side 30 may be first hooked to a flange 18 of rail 14, and flexible side 32 pressed into place by urging engagement surface 80 into contact with flange 16 to bend leg 34 rearwardly until flange 16 enters into the member 44 held by leg 34. Alternatively, flexible side 32 may be hooked to flange 16 first, and engagement surface 82 pressed against flange 18 to bend central portion 28 away from leg 34 until flange 18 enters into member 44 held by rigid side 30. Once secured to rail 14, module 12 may be removed by inserting a screw driver, or other prying tool into recess 39, and prying leg 34 rearwardly away from central portion 28, out of engagement with rail 14.

FIG. 7 represents an alternative embodiment of a module incorporating the present securement technique. The module, designated 84 in FIG. 7, includes a pair of mutually facing, flexible legs 86, 88 integrally formed with a central body portion 90. Each leg includes mounting cavity 40, 42 having features as described above, for receiving and supporting substantially identical securement members 44. In the embodiment shown in FIG. 7, securement members 44 are mounted such that V-shaped recesses 54 face outwardly, permitting module 84 to be secured to a rail 92 having inwardly-oriented side flanges 94. Elongated cavities 95 are formed in central body portion 90 to allow a screw driver or similar instrument to be inserted into engagement with recesses 39 in each leg for prying the leg out of engagement on the rail flange as described above.

As mentioned above, the present securement technique may be employed in modules configured to receive and support large format components, such as circuit boards and the like. FIG. 8 illustrates an alternative embodiment particularly well suited for supporting such large components. In the illustrated configuration, the module includes a panel 96 having a flexible structure 98 along a lower edge which may be deformed for attachment to a rail 14. Structure 98 includes a cavity 100 formed between a flexible leg 102, a lateral link 104 and a lower link 106. Panel 96 is molded integrally with leg 102 and links 104 and 106, and forms with the latter a four bar linkage. The combination of these elements creates a relatively stiff, yet resilient structure which may be deformed for installation of the module on rail 14 as described above. Where additional stiffness is desired, multiple lateral links 104 may be provided extending between panel 96 and lower link 106. As in the previous embodiments, substantially identical securement members 44 are received in appropriate mounting cavities for solidly fixing the module to rail 14. A recess 108 is provided beside lateral link 104 to receive a screw driver or similar instrument for prying structure 98 out of engagement on rail flange 16 for removal of the module.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A module configured to be secured to a mounting rail, the rail having first and second parallel raised mounting flanges extending along its length and a support web extending between the mounting flanges, the module comprising:

a body configured to overlie the rail web when the module is installed on the rail;

a first securement foot projecting from the body, the first securement foot configured at least partially to overlie the first flange when the module is installed on the rail;

a second securement foot projecting from the body, the second securement foot configured at least partially to overlie the second flange when the module is installed on the rail;

a first metallic interface member coupled to the first securement foot, the first interface member including a plurality of contact regions configured to exert holding force on the first flange; and a second metallic interface member coupled to the second securement foot, the second interface being substantially identical to the first interface member and including a plurality of contact regions configured to exert holding force on the second flange.

2. The module of claim 1, wherein each of the first and second interface members includes at least three separate contact regions configured to engage a flange of the rail.

3. The module of claim 1, wherein each of the first and second interface members includes a pair of side panels, the contact regions being formed in the side panels.

4. The module of claim 3, wherein each side panel of the first and second interface members has a generally V-shaped recess, interior walls of the recess forming the contact regions.

5. The module of claim 3, wherein each of the first and second interface members is a generally U-shaped element, and wherein each of the first and second securement feet includes a channel configured to receive the respective interface member.

6. The module of claim 1, wherein each of the first and second securement feet includes at least one integrally formed projection configured to contact a respective interface member to retain the interface member in a predetermined position on the securement foot.

7. The module of claim 1, wherein the first securement foot is substantially rigid with the body, and wherein the second securement foot is movable with respect to the body, whereby the module may be attached to the rail by movement of the second securement foot.

8. The module of claim 7, wherein the first and second securement feet each include a lower edge, at least a portion of the lower edge of each securement foot forming an entry surface, the entry surface being configured to contact a flange of the rail during installation of the module thereon and to cause movement of the second securement foot with respect to the body, whereby the first securement foot may be secured to the first flange prior to the second securement foot being secured to the second flange or the second engagement foot may be secured to the second flange prior to the first securement foot being secured to the first flange.

9. A module configured to be secured to a mounting rail, the rail having first and second parallel raised mounting flanges extending along its length and a support web extending between the mounting flanges, the module comprising:

a body configured to overlie the rail web when the module is installed on the rail;

a first securement foot projecting from the body, the first securement foot configured at least partially to overlie the first flange when the module is installed on the rail;

a second securement foot projecting from the body, the second securement foot configured at least partially to overlie the second flange when the module is installed on the rail;

a first interface member clipped to the first securement foot, the first interface member including at least three contact regions configured bear against the first flange and thereby to exert holding force on the first flange; and a second interface member clipped to the second securement foot, the second interface including at least three contact regions configured to bear against the second flange and thereby to exert holding force on the second flange.

10. The module of claim 9, wherein the first interface member is substantially identical to the second interface member.

11. The module of claim 9, wherein each of the first and second interface members includes a pair of side panels, the contact regions being formed in the side panels.

12. The module of claim 11, wherein each side panel of the first and second interface members has a generally V-shaped recess, interior walls of the recess forming the contact regions.

13. The module of claim 11, wherein each of the first and second interface members is a generally U-shaped element, and wherein each of the first and second securement feet includes a channel configured to receive the respective interface member.

14. The module of claim 9, wherein each of the first and second securement feet includes at least one integrally formed projection configured to contact a respective interface member to retain the interface member in a predetermined position on the securement foot.

15. The module of claim 9, wherein the first securement foot is substantially rigid with the body, and wherein the second securement foot is movable with respect to the body, whereby the module may be attached to the rail by movement of the second securement foot.

16. A modular component configured for mounting on a rail, the rail having first and second parallel raised mounting flanges extending along its length and a support web extending between the mounting flanges, the component comprising:

a body configured to overlie the rail web when the module is installed on the rail;

a first securement foot rigidly from the body and movable with respect to the body, the first securement foot being biased toward an operating position wherein the first securement foot at least partially overlies the first flange when the component is installed on the rail, the first securement foot having a first lower edge forming a first entry surface, the first entry surface being configured to contact the first flange and to urge the first securement foot away from the operating position during installation of the component on the rail;

a second securement foot rigidly secured to the body and configured at least partially to overlie the second flange when the component is installed on the rail, the second securement foot having a second lower edge forming a second entry surface, the second entry surface being configured to contact the second flange and to urge the body away from the first securement foot during installation of the component on the rail;

a first metallic interface member coupled to the first securement foot, the first interface member including a plurality of contact regions configured bear against the first flange and thereby to exert holding force on the first flange; and a second metallic interface member coupled to the second securement foot, the second interface member being substantially identical to the first interface member, the second interface including a plurality of contact regions configured to bear against the second flange and thereby to exert holding force on the second flange.

17. The component of claim 16, wherein each of the first and second interface members includes a pair of side panels, the contact regions being formed in the side panels.

18. The component of claim 17, wherein each side panel of the first and second interface members has a generally V-shaped recess, interior walls of the recess forming the contact regions.

19. The component of claim 16, wherein each of the first and second interface members is a generally U-shaped element, and wherein each of the first and second securement feet includes a channel configured to receive the respective interface member and an integral projection for securing the interface members within the channel.

* * * * *